(12) United States Patent
Gui et al.

(10) Patent No.: US 11,914,268 B2
(45) Date of Patent: Feb. 27, 2024

(54) OPTICAL FREQUENCY COMB LIGHT SOURCE AND OPTICAL FREQUENCY COMB GENERATION METHOD

(71) Applicant: Huawei Technologies Co., Ltd., Shenzhen (CN)

(72) Inventors: Chengcheng Gui, Wuhan (CN); Jialin Zhao, Wuhan (CN); Xiaolu Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 17/498,335

(22) Filed: Oct. 11, 2021

(65) Prior Publication Data
US 2022/0026780 A1 Jan. 27, 2022

Related U.S. Application Data

(63) Continuation of application No. PCT/CN2020/083394, filed on Apr. 5, 2020.

(30) Foreign Application Priority Data

Apr. 9, 2019 (CN) .......................... 201910280566.7

(51) Int. Cl.
G02F 1/35 (2006.01)

(52) U.S. Cl.
CPC ............ *G02F 1/3511* (2013.01); *G02F 1/353* (2013.01); *G02F 1/3542* (2021.01); *G02F 2203/56* (2013.01)

(58) Field of Classification Search
CPC ...... G02F 1/3511; G02F 1/353; G02F 1/3542; G02F 2203/56
See application file for complete search history.

(56) References Cited

U.S. PATENT DOCUMENTS 7,352,504 B2 * 4/2008 Hirooka ................ G02F 1/3515
359/326
8,681,827 B2 * 3/2014 Maleki .................... H03B 17/00
372/21
(Continued)

FOREIGN PATENT DOCUMENTS

CN 101877614 A 11/2010
CN 102223340 A 10/2011
(Continued)

OTHER PUBLICATIONS

Yi Xuan et al, "High-Q silicon nitride microresonators exhibiting low-power frequency comb initiation," Research Article vol. 3, No. 11, Nov. 2016, Optica, 10 pages.
(Continued)

*Primary Examiner* — Daniel Petkovsek
(74) *Attorney, Agent, or Firm* — Conley Rose, P.C.

(57) ABSTRACT

An optical frequency comb light source and an optical frequency comb generation method, where the light source includes a laser diode, a coupler, a Kerr nonlinear device, a beam splitter, and a phase shifter. The laser diode is connected to one input port of the coupler, and the other input port of the coupler is connected to an output port of the phase shifter. An output port of the coupler is connected to an input port of the Kerr nonlinear device. An output port of the Kerr nonlinear device is connected to an input port of the beam splitter. One output port of the beam splitter is connected to an input port of the phase shifter. The other output port of the beam splitter is configured to output a plurality of optical frequency combs. A multi-wavelength light source with relatively high power may be provided.

20 Claims, 5 Drawing Sheets

(56) References Cited

U.S. PATENT DOCUMENTS

| | | | |
|---|---|---|---|
| 11,175,563 B2 * | 11/2021 | Wong | G02F 1/365 |
| 2012/0243880 A1 | 9/2012 | Oda et al. | |
| 2012/0294319 A1 | 11/2012 | Maleki et al. | |
| 2015/0372447 A1 | 12/2015 | Song et al. | |

FOREIGN PATENT DOCUMENTS

| | | | |
|---|---|---|---|
| CN | 102608825 A | 7/2012 | |
| CN | 103838055 A | 6/2014 | |
| CN | 104777697 A | 7/2015 | |
| CN | 105071210 A | 11/2015 | |
| JP | 2015075614 A | 4/2015 | |
| WO | WO-2015012915 A2 * | 1/2015 | G02F 1/395 |

OTHER PUBLICATIONS

Joerg Pfeifle et al, "Coherent terabit communications with microresonator Kerr frequency combs," Letters, Published Online: Apr. 13, 2014 | DOI: 10.1038/NPHOTON.2014.57, 6 pages.

Changjing Bao et al, "Tunable insertion of multiple lines into a Kerr frequency comb using electro-optical modulators," Letter vol. 42, No. 19, Oct. 1, 2017, Optics Letters 3765, 4 pages.

* cited by examiner

OPTICAL FREQUENCY COMB LIGHT SOURCE AND OPTICAL FREQUENCY COMB GENERATION METHOD

CROSS-REFERENCE TO RELATED APPLICATIONS

This application is a continuation of International Patent Application No. PCT/CN2020/083394, filed on Apr. 5, 2020, which claims priority to Chinese Patent Application No. 201910280566.7, filed on Apr. 9, 2019. The disclosures of the aforementioned applications are hereby incorporated by reference in their entireties.

TECHNICAL FIELD

This application relates to the field of an optical component, and in particular, to an optical frequency comb light source and an optical frequency comb generation method.

BACKGROUND

With continuous increase of communication requirements, data amount transmitted through a single-wavelength channel also increases. However, the single-wavelength channel can reach only hundreds of gigabits (Gbits) at most, which cannot meet an increasing large-capacity requirement. In a multi-wavelength channel communication technology, one link supports a plurality of wavelength channels, and each wavelength channel is loaded with a high-speed signal. This technology may greatly improve link capacity to meet a requirement of large-capacity transmission. One of the key technologies in the multi-wavelength channel communication technology is a multi-wavelength light source.

The Kerr optical frequency comb technology is considered to be an alternative to providing the multi-wavelength light source. In this technology, an optical frequency comb (namely, a plurality of wavelengths) may be generated based on a Kerr nonlinear effect of a single microring resonant cavity. However, output optical power in a solution provided by the technology is relatively low, and cannot meet a power requirement of a multi-wavelength light source in an actual large-capacity transmission application. Currently, some related studies improve a quality (Q) factor of the microring resonant cavity to improve conversion efficiency of the optical frequency comb, but an effect is not good.

SUMMARY

Embodiments of this application provide an optical frequency comb light source and an optical frequency comb generation method, to improve output power of the optical frequency comb light source and meet a requirement of actual large-capacity multi-wavelength transmission for power of a light source.

According to a first aspect, an embodiment of this application provides an optical frequency comb light source. The light source includes a laser diode, a coupler, a Kerr nonlinear device, a beam splitter, and a phase shifter. The laser diode is connected to one input port of the coupler, and the other input port of the coupler is connected to an output port of the phase shifter. An output port of the coupler is connected to an input port of the Kerr nonlinear device. An output port of the Kerr nonlinear device is connected to an input port of the beam splitter. One output port of the beam splitter is connected to an input port of the phase shifter, and the other output port of the beam splitter is configured to output an optical frequency comb.

Using a feedback structure, the light source may produce Kerr nonlinear effect a plurality of times, and superimpose output multi-wavelength beams, to effectively improve output power of the light source.

With reference to the first aspect, in a first implementation, the light source further includes an optical amplifier (a first optical amplifier). The optical amplifier is placed between the coupler and the Kerr nonlinear device. In other words, the output port of the coupler is connected to an input port of the first optical amplifier, and an output port of the first optical amplifier is connected to the input port of the Kerr nonlinear device.

By placing the optical amplifier between the coupler and the Kerr nonlinear device, optical power of a single-wavelength beam output from the laser diode may be improved, to better produce the Kerr nonlinear effect. In addition, power amplification may be implemented on multi-wavelength beam from a feedback path. This further improves the output power of the light source.

With reference to the first implementation, in a second implementation, the light source further includes a polarization controller. That the output port of the first optical amplifier is connected to the input port of the Kerr nonlinear amplifier device includes: The output port of the first optical amplifier is connected to an input port of the polarization controller; and an output port of the polarization controller is connected to the output port of the Kerr nonlinear device.

The polarization controller is added, such that a polarization state of a beam input to the Kerr nonlinear device is consistent with a polarization state of the device, thereby improving optical conversion efficiency of the light source.

With reference to the first or the second implementation, in a third implementation, the first optical amplifier is an erbium-doped optical fiber amplifier or a semiconductor optical amplifier.

With reference to the first aspect, in a fourth implementation, the light source further includes an optical amplifier (a second optical amplifier); and the amplifier is placed between the laser diode and the coupler. In other words, the laser diode is connected to an input port of the second optical amplifier; and an output port of the second optical amplifier is connected to the one input port of the coupler.

A light source output by the laser diode is amplified by the second optical amplifier, such that output power of the light source can be further improved.

With reference to the fourth implementation, in a fifth implementation, the light source further includes a polarization controller. That an output port of the coupler is connected to an input port of the Kerr nonlinear device includes: The output port of the coupler is connected to an input port of the polarization controller; and an output port of the polarization controller is connected to the output port of the Kerr nonlinear device. The polarization controller is added, such that a polarization state of a beam input to the Kerr nonlinear device is consistent with the polarization state of the device, thereby improving optical conversion efficiency of the light source.

With reference to the fourth or the fifth implementation, in a sixth implementation, the second optical amplifier is an erbium-doped optical fiber amplifier or a semiconductor optical amplifier.

With reference to the first aspect or any one of the fourth implementation to the sixth implementation, in a seventh implementation, the light source further includes a third optical amplifier. That other input port of the coupler is connected to an output port of the phase shifter includes: The other input port of the coupler is connected to an output port of the third optical amplifier; and an input port of the third optical amplifier is connected to the output port of the phase shifter.

Output power of the phase shifter may be improved using the third optical amplifier, thereby further improving power of a feedback beam that enters the Kerr nonlinear device. This helps further improve the output power of the light source.

With reference to the seventh implementation, in an eighth implementation, the third optical amplifier is an erbium-doped optical fiber amplifier or a semiconductor optical amplifier.

With reference to the first aspect or any one of the implementations in the first aspect, in a ninth implementation, the light source further includes a filter. The filter is configured to connect the beam splitter and the phase shifter, or the filter is configured to connect the phase shifter and the coupler.

A filter is used, to flexibly adjust a quantity of wavelengths included in an output optical frequency comb, in order to implement a light source that supports different quantities of wavelengths.

With reference to any one of the first aspect or any one of the implementations of the first aspect, in a tenth implementation, the Kerr nonlinear device is a microring, a highly nonlinear fiber, a photonic crystal microcavity, or a microdisk. For example, when the Kerr nonlinear device is the microring, a material of the microring includes silicon carbide, a lithium niobate thin film, or silicon dioxide.

According to a second aspect, an embodiment provides an optical transmitter apparatus. The optical transmitter apparatus includes the light source according to the first aspect or any one of the implementations of the first aspect, a wavelength division demultiplexer, a plurality of modulators, and a wavelength division multiplexer. The light source is connected to an input port of the wavelength division demultiplexer; a plurality of output ports of the wavelength division demultiplexer are connected to input ports of the plurality of modulators; output ports of the plurality of modulators are connected to a plurality of input ports of the wavelength division multiplexer; and the wavelength division multiplexer is configured to output a multi-wavelength optical signal.

According to a third aspect, an embodiment provides an optical frequency comb generation method. The method includes: receiving a first beam, where the first beam is a single-wavelength beam; combining the first beam and a second beam, to output a third beam; inputting the third beam to a Kerr nonlinear device, to output a fourth beam, where the fourth beam is a multi-wavelength beam; splitting the fourth beam to generate a fifth beam and a sixth beam, where the fifth beam is an output beam (also referred to as an output frequency comb); and performing phase control on the sixth beam, to output the second beam.

Optionally, before the combination, the first beam or the second beam may be amplified, or the two beams may be both amplified, to further improve output optical frequency comb power. Alternatively, optionally, the third beam may be amplified and then input to the Kerr nonlinear device.

Optionally, the third beam may be input to the Kerr nonlinear device after polarization control is performed on the third beam. A polarization state of an input beam is consistent with a polarization state of the Kerr nonlinear device through the polarization control, thereby improving optical conversion efficiency.

Optionally, the sixth beam or the second beam may be filtered, to flexibly control a quantity of wavelengths of an output optical frequency comb.

Using the optical frequency comb light source technology disclosed in this application, multi-wavelength output with relatively high power is implemented, and a power requirement for a multi-wavelength light source in a practical application can be met.

BRIEF DESCRIPTION OF DRAWINGS

The following describes in detail the embodiments of this application with reference to the accompanying drawings.

DESCRIPTION OF EMBODIMENTS

Figure 1:
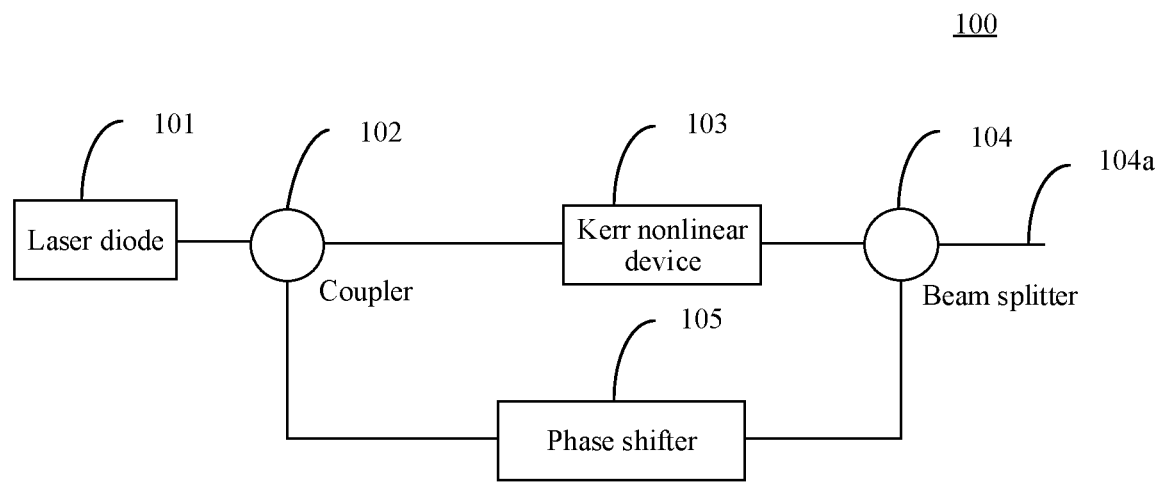
FIG. 1 is a schematic structural diagram of an optical frequency comb light source according to an embodiment of this application.

Device forms and service scenarios described in embodiments of this application are intended to describe technical solutions of embodiments of this application more clearly, and do not constitute a limitation on the technical solutions provided in the embodiments of the present disclosure. A person of ordinary skill in the art may understand that, with evolution of a device form and emergence of a new service scenario, the technical solutions provided in the embodiments of this application are also applicable to similar technical problems.

The technical solutions provided in this application may be applied to multi-wavelength channel transmission scenarios, for example, an optical backbone transmission network, an optical access network, data center optical transmission, short-distance optical interconnection, and wireless service fronthaul/backhaul. For example, the technical solutions provided in this application may be applied to a transmitter-side device and/or a receiver-side device corresponding to the foregoing different networks.

It should be noted that the terms "first", "second", and the like in this application are used to distinguish between similar objects but do not necessarily indicate a specific order or sequence. It should be understood that the data termed in such a way is interchangeable in proper cases, such that the embodiments described herein can be implemented in an order not described in this application. The term "and/or" is used to describe an association relationship between associated objects and indicates that three relationships may exist. For example, A and/or B may represent the following three cases: Only A exists, both A and B exist, and only B exists. A specific operation method in a method embodiment may also be applied to an apparatus embodiment. On the contrary, component function description in the apparatus embodiment is also applicable to related description in the method embodiment.

It should be further noted that, unless otherwise specified, specific descriptions of some technical features in one embodiment may further be applied to explain corresponding technical features mentioned in other embodiments. For example, specific description of a Kerr nonlinear device in an embodiment is applicable to a corresponding Kerr nonlinear device in another embodiment. For example, an implementation of a phase shifter in an embodiment is applicable to a corresponding phase shifter in another embodiment. In addition, to more clearly reflect a relationship between components in different embodiments, in this application, same or similar reference numerals are used to represent components with a same or similar function in different embodiments.

In addition, connection mentioned in this application may be direct connection or indirect connection. For a specific connection relationship, refer to subsequent descriptions in corresponding embodiments. Unless otherwise specified, "connection" should not be overly restrictive.

Currently, a Kerr nonlinear device (also referred to as a Kerr nonlinear optical device) may make input single-wavelength light produce a Kerr nonlinear effect and generate a Kerr optical frequency comb (that is, output multi-wavelength light), to provide a multi-wavelength light source. However, output power of a current multi-wavelength light source solution is relatively low, and cannot meet a requirement of an actual network application.

Therefore, this application provides a new optical frequency comb light source. The apparatus may superimpose multi-wavelength light a plurality of times and then output the multi-wavelength light, to output a multi-wavelength light source with relatively high power, thereby meeting a power requirement for the multi-wavelength light source in the actual network application. Using the apparatus, an optical communications device can implement large-capacity transmission. In addition, the apparatus has a simple structure and low costs.

FIG. 1 is a schematic structural diagram of an optical frequency comb light source according to an embodiment of this application. An apparatus 100 includes a laser diode (LD) 101, a coupler 102, a Kerr nonlinear device 103, a beam splitter 104, and a phase shifter 105.

Connection relationships between these components are described as follows below.

The LD 101 is connected to one input port of the coupler 102. The other input port of the coupler 102 is connected to an output port of the phase shifter 105. An output port of the coupler 102 is connected to an input port of the Kerr nonlinear device 103. An output port of the Kerr nonlinear device 103 is connected to an input port of the beam splitter 104. One output port of the beam splitter 104 is connected to an input port of the phase shifter 105. The output port (104a in FIG. 1) of the beam splitter 104 is an output port of the optical frequency comb light source, and is configured to output an optical frequency comb. It should be noted that the optical frequency comb is a substitute for a plurality of wavelengths.

In the apparatus 100, the coupler includes three ports (two input ports and one output port). The beam splitter includes three ports (one input port and two output ports). The LD 101 is configured to generate single-wavelength light. The coupler 102 is configured to combine light of the two input ports of the coupler 102 and output the combined light from the output port of the coupler 102. The Kerr nonlinear device refers to a device that can convert an output single wavelength into a plurality of wavelengths for output. The beam splitter 104 is configured to split light that is input from the input port of the beam splitter 104 into two parts, and separately output the two parts from two output ports of the beam splitter 104. For example, one output port of the beam splitter 104 is used as a multi-wavelength output port of the apparatus 100. The other output port feeds one part of the light back to the Kerr nonlinear device again, and then the Kerr effect occurs again. Then, the light is superimposed on the light frequency comb output by the LD through the nonlinear device. The phase shifter 105 is configured to adjust and control a phase of light passing through the component, such that a phase of the part of light that is fed back and a phase of the optical frequency comb that is output by the LD through the nonlinear device meet or basically meet a phase matching condition. In this way, power of an optical frequency comb generated after the Kerr effect reoccurs is added to power of the optical frequency comb output by the LD through the nonlinear device. The phase matching condition is that a phase difference between two beams of light is 0 or an integer multiple of $2\pi$. Basically meeting is that the phase difference between the two beams of light is approximately 0 or an integer multiple of $2\pi$, and that after optical power of the two beams of light is superimposed, output power can still be significantly increased. It should be noted that, when the phase matching condition is met, the output power after the optical power of the two beams of light is superimposed is the largest.

For example, the LD may have a fixed frequency (that is, output light of a single fixed wavelength). Alternatively, the LD may have a tunable wavelength (that is, an output wavelength may be changed). In the latter case, the apparatus 100 may be a multi-wavelength light source that can provide different bands, that is, a tunable multi-wavelength light source.

It should be noted that, currently, a single-wavelength-to-multi-wavelength conversion phenomenon is referred to as a Kerr nonlinear effect or a Kerr effect for short by a person skilled in the art. However, with development of optical component technologies, another effect of an optical component may also be able to implement a single-wavelength-to-multi-wavelength conversion. It should be understood that a device having the other effect also belongs to the Kerr nonlinear device described in this application. For example, the Kerr nonlinear device may be a microring resonator (referred to as a microring for short below), a highly nonlinear optical fiber (for example, a highly nonlinear photonic crystal optical fiber), a microdisk, a photonic crystal microcavity, or the like.

In an optical frequency comb light source 100, a part of multi-wavelength light is split by the beam splitter, and after performing phase adjustment on the part of multi-wavelength light by the phase shifter, a phase of the multi-wavelength light and a phase of multi-wavelength light generated after the single-wavelength light output by the LD is input to the Kerr nonlinear device 103 meet the phase matching condition. Then, after being combined by the coupler, the multi-wavelength light is input to the Kerr nonlinear device again. A part of the multi-wavelength light is output by the beam splitter, and the other part of the multi-wavelength light is still used for the foregoing superposition process. Power of the multi-wavelength light output by the beam splitter is greatly improved through one or more times of superposition, meeting an actual application requirement.

The following further describes the embodiment of this application in detail based on the foregoing described common aspects related to the optical frequency comb light source with reference to more accompanying drawings. It should be noted that the optical frequency comb light source shown in FIG. 1 may be a system constructed by a discrete device. Alternatively, the light source may be a photonic integrated circuit (PIC). For example, a silicon photonic integrated chip, a gallium arsenide integrated chip, an indium phosphide integrated chip, or a lithium niobate integrated chip. With development of PIC technology, the light source provided in this embodiment of this application may alternatively be a PIC made of a new material. A specific form of the optical frequency comb light source is not limited in this application.

Figure 2:
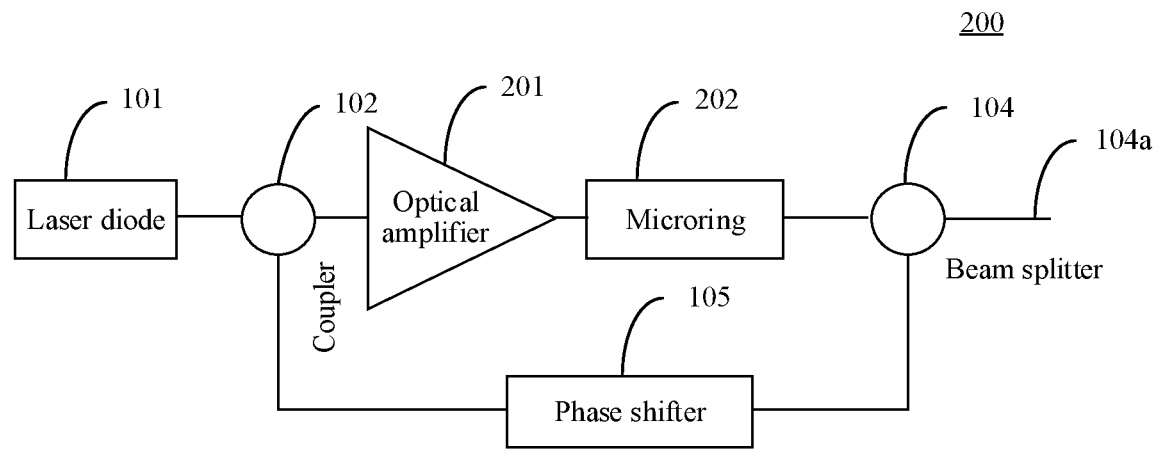
FIG. 2 is a schematic structural diagram of a possible optical frequency comb light source according to an embodiment of this application.

FIG. 2 is a schematic structural diagram of a possible optical frequency comb light source according to an embodiment of this application. A multi-wavelength light source 200 includes: an LD 101, a coupler 102, an optical amplifier 201, a microring 202, a beam splitter 104, and a phase shifter 105.

Connection relationships between these components are described as follows below.

The LD 101 is connected to one input port of the coupler 102. The other input port of the coupler 102 is connected to an output port of the phase shifter 105. An output port of the coupler 102 is connected to an input port of the microring 202 through the optical amplifier 201. In other words, the output port of the coupler 102 is connected to an input port of the optical amplifier 201; and an output port of the optical amplifier 201 is connected to the input port of the microring 202. An output port of microring 202 is connected to an input port of the beam splitter 104. One output port of the beam splitter 104 is connected to an input port of the phase shifter 105. The other output port (104a) of the beam splitter 104 is an output port of the optical frequency comb light source, and is configured to output an optical frequency comb.

A difference between the embodiment shown in FIG. 2 and the structure shown in FIG. 1 lies in that: First, a Kerr nonlinear device is a microring in this embodiment; and second, the optical amplifier 201 is added in this embodiment. The component is configured to amplify light input to the component, such that optical power entering the microring 202 is large enough to produce a Kerr nonlinear effect. In addition, the optical amplifier 201 may further amplify multi-wavelength light that is fed back, thereby further improving output power of the optical comb light source. For functions of other components, refer to related descriptions in FIG. 1. Details are not described herein again.

It should be noted that a material used for a microring may be silicon carbide, a lithium niobate thin film, or silicon dioxide. A phase shifter may be an existing commercial phase shifter or phase modulator that can change a phase of a beam. Alternatively, if the light frequency comb light source is an integrated chip, the phase shifter may be an optical heater or a titanium nitride (TiN) phase shifter. It should be understood that, with development of optical component technologies, a component that can implement the foregoing functions is also considered as an example of the phase shifter mentioned in this application.

For example, an optical amplifier may be an erbium-doped optical fiber amplifier (EDFA). Alternatively, the optical amplifier may be a semiconductor optical amplifier. Compared with the EDFA, a semiconductor optical amplifier is smaller in size and can amplify power of a plurality of bands.

Optionally, the microring 202 may be replaced with another Kerr nonlinear device mentioned in FIG. 1.

Multi-wavelength output with high power may be implemented using the optical frequency comb light source 200 shown in FIG. 2. In addition, output power of the optical frequency comb light source may be further improved by adding the component of the optical amplifier.

Figure 3:
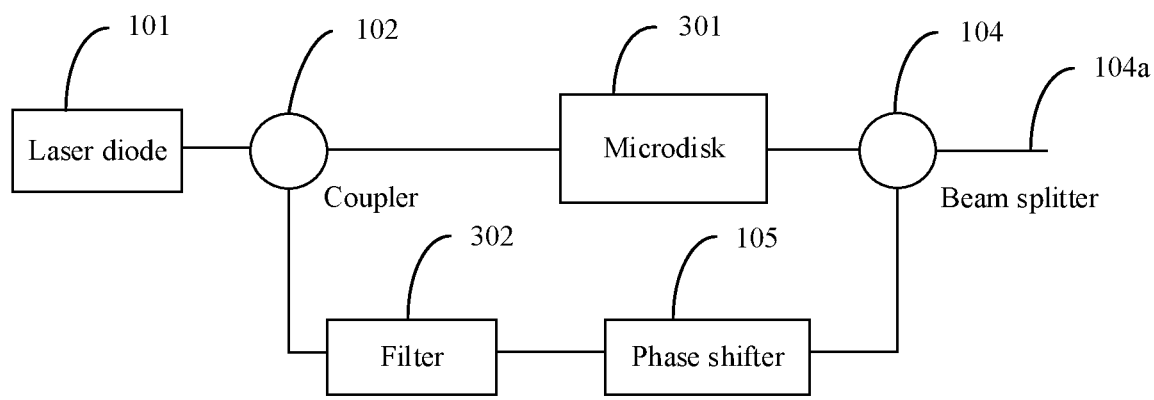
FIG. 3 is a schematic structural diagram of another possible optical frequency comb light source according to an embodiment of this application.

FIG. 3 is a schematic structural diagram of another possible optical frequency comb light source according to an embodiment of this application. The light source 300 includes: an LD 101, a coupler 102, a microdisk 301, a beam splitter 104, a filter 302, and a phase shifter 105.

Connection relationships between these components are basically the same as the connection relationships shown in FIG. 1, and details are not described again. A main difference between the connection relationships shown in FIG. 3 and the connection relationships shown in FIG. 1 is as follows: The phase shifter 105 is not directly connected to the coupler 102, but is connected to the coupler 102 through the filter 302. In other words, an output port of the phase shifter 105 is connected to an input port of the filter 302; and an output port of the filter 302 is connected to the other input port of the coupler 102.

A difference between the embodiment shown in FIG. 3 and the structure shown in FIG. 1 lies in that: First, a Kerr nonlinear device is a microdisk in this embodiment; and second, the filter 302 is added in this embodiment. The filter 302 is configured to filter multi-wavelength light input to the filter 302, to control a quantity of wavelengths output by the optical frequency comb light source. For example, multi-wavelength light source output of any quantity such as four channels and eight channels may be implemented using the filter 302. For functions of other components, refer to related descriptions in FIG. 1. Details are not described herein again.

It should be noted that a material used for a microdisk may be silicon carbide, a lithium niobate thin film, or silicon dioxide.

It should be further noted that, in addition to the manner shown in FIG. 3, a filter may be further placed in another location. For example, the filter may be placed between a beam splitter and a phase shifter. Alternatively, the filter may be placed on an output port of the beam splitter. Compared with the third manner, in the first two manners, output power of the multi-wavelength light source may be better improved by filtering and then amplifying.

According to an actual design requirement, the filter may be a component that may implement a filtering function, such as a wavelength selective switch (WSS), an arrayed waveguide grating, or a diffraction grating.

Optionally, the microdisk 301 may be replaced with another Kerr nonlinear device mentioned in FIG. 1. For example, the microdisk 301 is replaced with the microring shown in FIG. 2.

Multi-wavelength output with high power may be implemented using the optical frequency comb light source 300 shown in FIG. 3. In addition, a quantity of wavelengths output by the optical frequency comb light source may be further controlled by adding the filter component, to meet a requirement for a quantity of light source required for a network in actual use.

Figure 4:
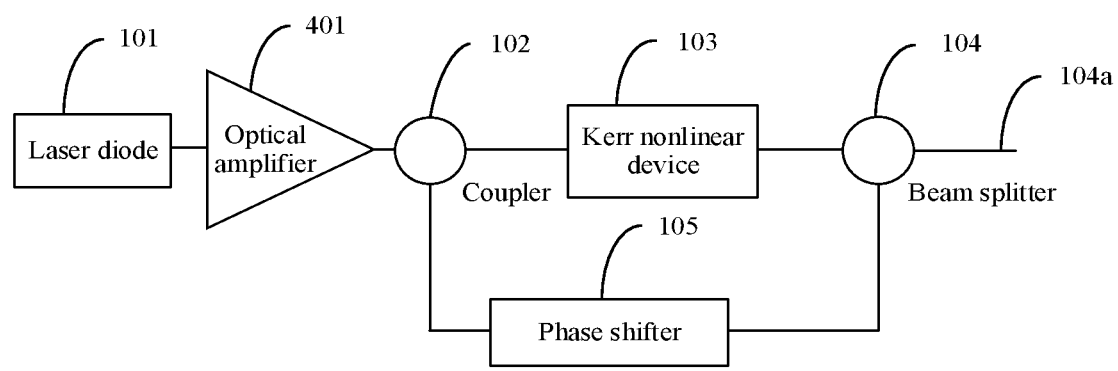
FIG. 4 is a schematic structural diagram of still another possible optical frequency comb light source according to an embodiment of this application.

FIG. 4 is a schematic structural diagram of still another possible optical frequency comb light source according to an embodiment of this application. The multi-wavelength light source 400 includes: an LD 101, a coupler 102, an optical amplifier 401, a Kerr nonlinear device 103, a beam splitter 104, and a phase shifter 105.

Connection relationships between these components are basically the same as the connection relationships shown in FIG. 1, and details are not described again. A main difference between the connection relationships shown in FIG. 4 and the connection relationships shown in FIG. 1 is as follows: The laser diode 101 is not directly connected to the coupler 102, but is connected to the coupler 102 through the optical amplifier 401. In other words, an output port of the laser diode 101 is connected to an input port of the optical amplifier 401; and an output port of the optical amplifier 401 is connected to one input port of the coupler 102.

Compared with the light source structure in FIG. 1, the optical amplifier 401 is added in this embodiment. The component is configured to amplify light output by the laser diode, such that power of the light entering the Kerr nonlinear device 103 is large enough to produce a Kerr nonlinear effect. In other words, a laser diode with relatively low power may be used together with an optical amplifier to implement a multi-wavelength light source. For functions of other components, refer to related descriptions in FIG. 1. Details are not described herein again.

Optionally, a filter may be further added to the optical frequency comb light source shown in FIG. 4. For related description, refer to the description in FIG. 3. Details are not described herein again.

Multi-wavelength output with high power may be implemented using the optical frequency comb light source shown in FIG. 4. For example, a structure of the optical amplifier and a low-power laser diode with relatively low costs is used, such that costs of a light source can be controlled.

Figure 5:
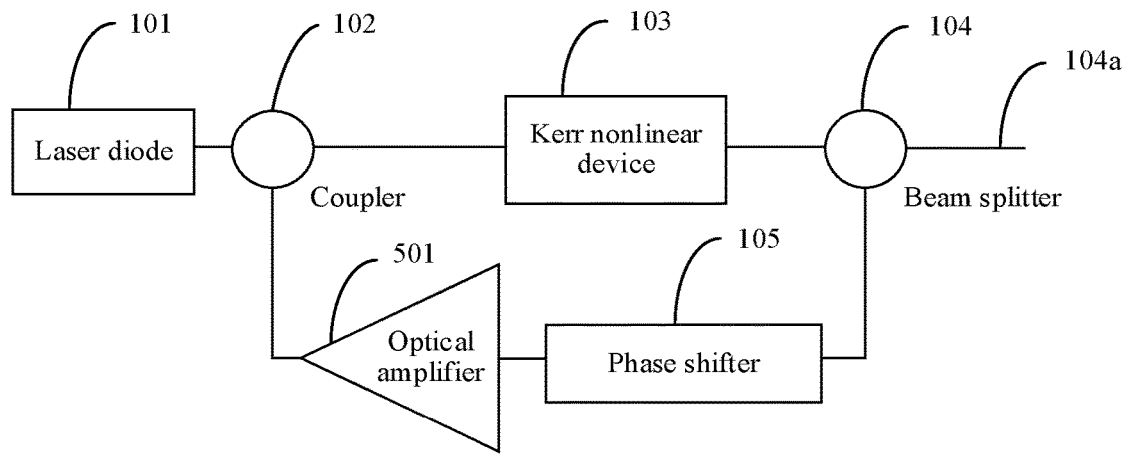
FIG. 5 is a schematic structural diagram of a fourth possible optical frequency comb light source according to an embodiment of this application.

FIG. 5 is a schematic structural diagram of a fourth possible optical frequency comb light source according to an embodiment of this application. The multi-wavelength light source 500 includes: an LD 101, a coupler 102, an optical amplifier 501, a Kerr nonlinear device 103, a beam splitter 104, and a phase shifter 105.

Connection relationships between these components are basically the same as the connection relationships shown in FIG. 1, and details are not described again. A main difference between the connection relationships shown in FIG. 5 and the connection relationships shown in FIG. 1 is as follows: The phase shifter 105 is not directly connected to the coupler 102, but is connected to the coupler 102 through the optical amplifier 501. In other words, an output port of the phase shifter 105 is connected to an input port of the optical amplifier 501; and an output port of the optical amplifier 501 is connected to the other input port of the coupler 102.

Compared with the light source structure in FIG. 1, the optical amplifier 501 is added in this embodiment. The component is configured to amplify light that is split from the beam splitter and that is fed back into the Kerr nonlinear device, such that power of light output from the beam splitter is larger. In addition, output power of the optical frequency comb light source may be further improved using the optical amplifier 501.

Optionally, a filter may be further added to the optical frequency comb light source shown in FIG. 5. For related description, refer to the description in FIG. 3. Details are not described herein again. It should be noted that, if both the optical amplifier 501 and the filter are configured to connect the coupler 102 and the phase shifter 105, a specific connection relationship is not limited in this application. For example, the coupler 102, the optical amplifier 501, the filter, and the phase shifter 105 may be sequentially connected. For example, the coupler 102, the filter, the optical amplifier 501, and the phase shifter may be connected one by one. For a similar case, unless otherwise specified, a similar variation may be made to a connection manner based on a specific requirement.

Optionally, the optical frequency comb light source shown in FIG. 5 may further include another optical amplifier. For related description, refer to the description in FIG. 4. Details are not described herein again.

Multi-wavelength output with high power may be implemented using the optical frequency comb light source 500 shown in FIG. 5. Optical power of the optical frequency comb light source may be further improved by further amplifying light on a feedback loop.

Figure 6:
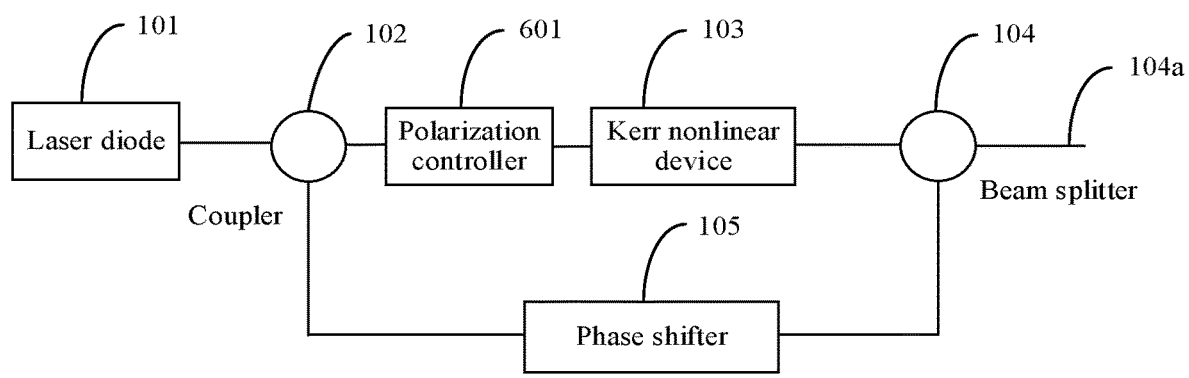
FIG. 6 is a schematic structural diagram of a fifth possible optical frequency comb light source according to an embodiment of this application.

FIG. 6 is a schematic structural diagram of a fifth possible optical frequency comb light source according to an embodiment of this application. The multi-wavelength light source 600 includes: an LD 101, a coupler 102, a polarization controller 601, a Kerr nonlinear device 103, a beam splitter 104, and a phase shifter 105.

Connection relationships between these components are basically the same as the connection relationships shown in FIG. 1, and details are not described again. A main difference between the connection relationships shown in FIG. 6 and the connection relationships shown in FIG. 1 is as follows: The coupler 102 is not directly connected to the Kerr nonlinear device 103, but is connected to the Kerr nonlinear device 103 through the polarization controller 601. In other words, an output port of the coupler 102 is connected to an input port of the polarization controller 601; and an output port of the polarization controller 601 is connected to an input port of the Kerr nonlinear device 103.

Compared with the light source structure in FIG. 1, the polarization controller 601 is added to the source 600 in this embodiment. The component is configured to control a polarization state of light entering the component, such that a polarization state of the light entering the Kerr nonlinear device 103 is consistent with a polarization state of the device 103, thereby improving optical conversion efficiency. In addition, the polarization controller 601 is used, and a non-polarized device may be used as another component. In this way, costs are relatively low. For example, the coupler 102 may be a non-polarized coupler.

Optionally, a filter or an optical amplifier may be further added to the optical frequency comb light source shown in FIG. 6. For related description, refer to the description in FIG. 2 to FIG. 4. Details are not described herein again.

Multi-wavelength output with high power may be implemented using the optical frequency comb light source 600 shown in FIG. 6. Using a polarization controller, conversion efficiency may be improved, and costs of the optical frequency comb light source may be reduced.

Figure 7:
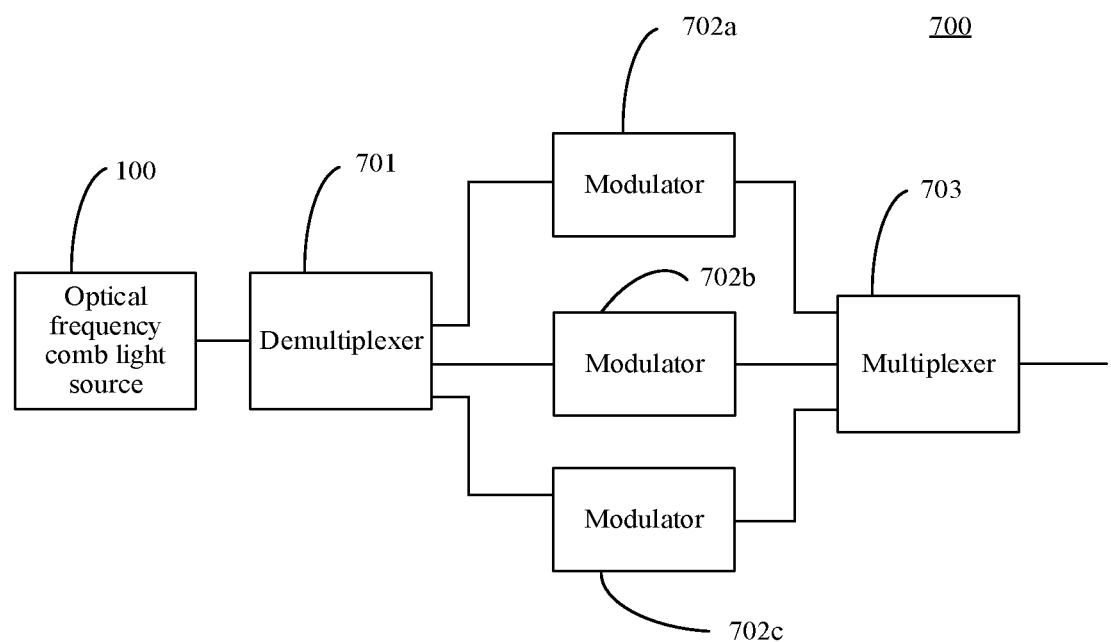
FIG. 7 is a schematic structural diagram of a possible optical transmitter apparatus according to an embodiment of this application.

FIG. 7 is a schematic structural diagram of a possible optical transmitter apparatus according to an embodiment of this application. For example, the optical transmitter apparatus 700 includes an optical frequency comb light source 100, a wavelength division demultiplexer 701, modulators (702*a* to 702*c*), and a wavelength division multiplexer 703. The optical transmitter apparatus is a multi-wavelength transmitter apparatus. The optical frequency comb light source provides a plurality of wavelengths, and after the plurality of wavelengths are separated using the wavelength division demultiplexer 701, the plurality of wavelengths are respectively input to corresponding modulators. The modulators may load to-be-transmitted data onto a corresponding wavelength. Finally, the wavelength division multiplexer 703 combines a plurality of wavelengths to which data is loaded, and transmits the plurality of wavelengths through an optical fiber. It should be noted that a wavelength to which data is loaded is also referred to as an optical signal.

It should be noted that the optical frequency comb light source 100 may be replaced with a structure of any optical frequency comb light source in FIG. 2 to FIG. 6, or may be replaced with an optional implementation provided in the foregoing description. A quantity of modulators cannot be greater than a quantity of the wavelengths provided by the optical frequency comb light source.

For example, the optical transmitter apparatus 700 may be a foregoing transmitter-side device and/or a receiver-side device. Alternatively, the optical transmitter apparatus 700 may be an optical module, for example, an optical transmitter or an optical transceiver.

Figure 8:
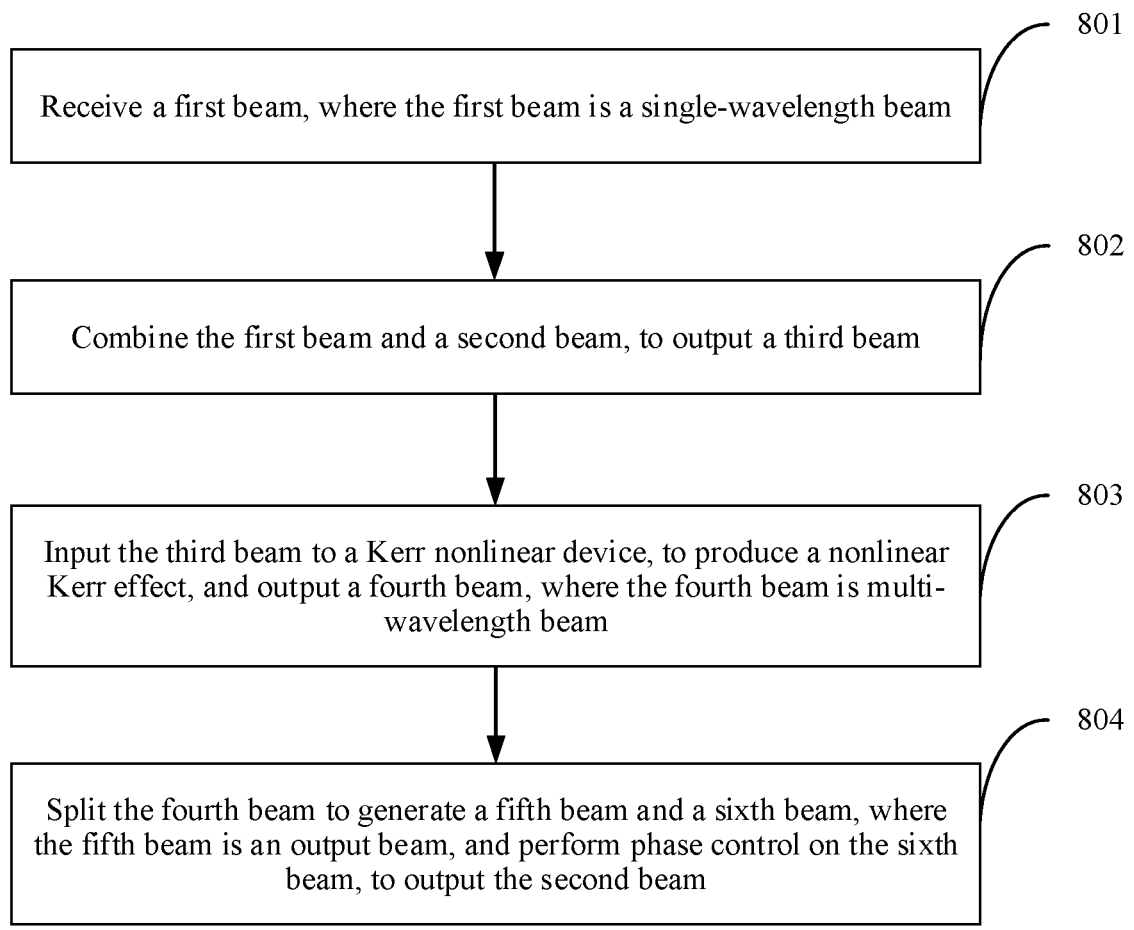
FIG. 8 shows an optical frequency comb generation method according to an embodiment of this application.

FIG. 8 shows an optical frequency comb light source generation method according to an embodiment of this application. For example, the method includes the following.

Step 801: Receive a first beam, where the first beam is a single-wavelength beam.

Step 802: Combine the first beam and a second beam, to output a third beam.

Optionally, the first beam is amplified and then combined.

Step 803: Input the third beam to a Kerr nonlinear device, to output a fourth beam, where the fourth beam is a multi-wavelength beam.

Optionally, the third beam is amplified and then input to the Kerr nonlinear device.

Optionally, the third beam is input to the Kerr nonlinear device after polarization control is performed on the third beam.

It should be noted that the fourth beam may also be referred to as a frequency comb.

Step 804: Split the fourth beam to generate a fifth beam and a sixth beam, where the fifth beam is an output beam; and perform phase control on the sixth beam, to output the second beam.

It should be noted that the fifth beam may also be an output optical frequency comb or an output multi-wavelength beam.

Optionally, before or after the phase control, filtering processing may be further performed, and then the second beam is output.

Optionally, after the phase control, amplification may be further performed, and then the second beam is output.

It should be noted that the foregoing beams are continuous light. In addition, the beam processing step mentioned in the method in FIG. 8 corresponds to the related description of the optical frequency comb light source mentioned in FIG. 1 to FIG. 6, and details are not described herein again.

By designing a feedback path, the foregoing method for generating the optical frequency comb may provide a multi-wavelength light source with relatively high power. It should be noted that the foregoing one or more steps may be performed for a plurality of times, such that output of the multi-wavelength light source with relatively high power may be achieved.

Finally, it should be noted that the foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical frequency comb light source, comprising:
   a laser diode;
   a coupler comprising a first coupler input port, a second coupler input port, and a coupler output port, wherein the first coupler input port is connected to the laser diode;
   a Kerr nonlinear device comprising a Kerr input port and a Kerr output port, wherein the Kerr input port is connected to the coupler output port;
   a beam splitter comprising a beam splitter input port, a first beam splitter output port, and a second beam splitter output port, wherein the beam splitter input port is connected to the Kerr output port;
   a phase shifter comprising a phase shifter input port and a phase shifter output port, wherein the phase shifter input port is connected to the first beam splitter output port; and
   a first optical amplifier, wherein the coupler output port is coupled to the Kerr input port such that the coupler output port is coupled to an input port of the first optical amplifier, and
   wherein the second beam splitter output port is configured to output an optical frequency comb.

2. The optical frequency comb light source according to claim 1, wherein the coupler output port is coupled to the Kerr input port further such that an output port of the first optical amplifier is connected to the Kerr input port.

3. The optical frequency comb light source according to claim 2, further comprising a polarization controller, wherein the output port of the first optical amplifier is connected to the Kerr input port such that:
   the output port of the first optical amplifier is connected to an input port of the polarization controller; and
   an output port of the polarization controller is connected to the Kerr output port.

4. The optical frequency comb light source according to claim 3, further comprising a second optical amplifier, wherein the laser diode is connected to the first coupler input port such that:
   the laser diode is connected to an input port of the second optical amplifier; and
   an output port of the second optical amplifier is connected to the input port of the polarization controller.

5. The optical frequency comb light source according to claim 4, wherein the coupler output port is connected to the Kerr input port such that:
   the coupler output port is connected to the input port of the polarization controller; and
   the output port of the polarization controller is connected to the Kerr output port.

6. The optical frequency comb light source according to claim 4, wherein the second optical amplifier is an erbium-doped optical fiber amplifier or a semiconductor optical amplifier.

7. The optical frequency comb light source according to claim 4, further comprising a second optical amplifier, wherein the second coupler input port is connected to the phase shifter output port such that:
   the second coupler input port is connected to an output port of the third optical amplifier; and
   an input port of the third optical amplifier is connected to the phase shifter output port.

8. The optical frequency comb light source according to claim 7, wherein the third optical amplifier is an erbium-doped optical fiber amplifier or a semiconductor optical amplifier.

9. The optical frequency comb light source according to claim 2, wherein the first optical amplifier is an erbium-doped optical fiber amplifier or a semiconductor optical amplifier.

10. The optical frequency comb light source according to claim 1, further comprising a filter configured to connect the phase shifter to one of the beam splitter or the coupler.

11. The optical frequency comb light source according to claim 1, wherein the Kerr nonlinear device is a microring, a highly nonlinear optical fiber, a photonic crystal microcavity, or a microdisk.

12. The optical frequency comb light source according to claim 11, wherein the Kerr nonlinear device is the microring, and wherein a material of the microring comprises silicon carbide, a lithium niobate thin film, or silicon dioxide.

13. An optical apparatus, comprising:
an optical frequency comb light source, wherein the optical frequency comb light source comprises:
a laser diode;
a coupler comprising a first coupler input port, a second coupler input port, and a coupler output port, wherein the first coupler input port is connected to the laser diode;
a Kerr nonlinear device comprising a Kerr input port and a Kerr output port, wherein the Kerr input port is connected to the coupler output port;
a beam splitter comprising a beam splitter input port, a first beam splitter output port, and a second beam splitter output port, wherein the beam splitter input port is connected to the Kerr output port; and
a phase shifter comprising a phase shifter input port and a phase shifter output port, wherein the phase shifter input port is connected to the first beam splitter output port; and
a first optical amplifier, wherein the coupler output port is coupled to the Kerr input port such that the coupler output port is coupled to an input port of the first optical amplifier, and
wherein the second beam splitter output port is configured to output an optical frequency comb.

14. The optical apparatus according to claim 13, wherein the optical frequency comb light source further comprises a first optical amplifier, and wherein the coupler output port is connected to the Kerr input port such that:
the coupler output port is connected to an input port of the first optical amplifier; and
an output port of the first optical amplifier is connected to the Kerr input port.

15. The optical apparatus according to claim 14, wherein the optical frequency comb light source further comprises a polarization controller, and wherein the output port of the first optical amplifier is connected to the Kerr input port such that:
the output port of the first optical amplifier is connected to an input port of the polarization controller; and
an output port of the polarization controller is connected to the Kerr output port.

16. The optical apparatus according to claim 15, wherein the optical frequency comb light source further comprises a second optical amplifier, wherein the laser diode is connected to connected to the first coupler input port such that:
the laser diode is connected to an input port of the second optical amplifier; and
an output port of the second optical amplifier is connected to the input port of the polarization controller.

17. The optical apparatus according to claim 16, wherein the coupler output port is connected to the Kerr input port such that:
the coupler output port is connected to the input port of the polarization controller; and
the output port of the polarization controller is connected to the Kerr output port.

18. The optical apparatus according to claim 16, wherein the second optical amplifier is an erbium-doped optical fiber amplifier or a semiconductor optical amplifier.

19. The optical apparatus according to claim 14, wherein the first optical amplifier is an erbium-doped optical fiber amplifier or a semiconductor optical amplifier.

20. The optical apparatus according to claim 13, wherein the optical frequency comb light source comprises a filter configured to connect the phase shifter to one of the beam splitter or the coupler.

* * * * *